United States Patent
Bary et al.

(10) Patent No.: US 7,624,173 B2
(45) Date of Patent: Nov. 24, 2009

(54) METHOD AND SYSTEM FOR CLASSIFYING CONTENT AND PRIORITIZING WEB SITE CONTENT ISSUES

(75) Inventors: Emad Abdel Bary, Ottawa (CA); Ruth Milling, Nepean (CA); D. Gordon Smith, Ottawa (CA); Gerard Torenvliet, Nepean (CA); Jozsef Horvath, Ottawa (CA); Kari Simpson, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 10/361,948

(22) Filed: Feb. 10, 2003

(65) Prior Publication Data

US 2004/0158429 A1    Aug. 12, 2004

(51) Int. Cl.
*G06F 15/177* (2006.01)
(52) U.S. Cl. .................. 709/224; 709/204; 709/219; 709/242; 707/10; 707/102
(58) Field of Classification Search ................. 709/203, 709/219, 224, 242; 707/10, 102
See application file for complete search history.

(56) References Cited

U.S. PATENT DOCUMENTS

| | | | |
|---|---|---|---|
| 5,999,929 A | 12/1999 | Goodman | |
| 6,253,204 B1 * | 6/2001 | Glass et al. | 707/102 |
| 6,591,266 B1 * | 7/2003 | Li et al. | 707/10 |
| 6,697,969 B1 * | 2/2004 | Merriam | 714/46 |
| 6,766,370 B2 * | 7/2004 | Glommen et al. | 709/224 |
| 6,792,458 B1 * | 9/2004 | Muret et al. | 709/224 |
| 2002/0013782 A1 | 1/2002 | Ostroff et al. | |
| 2003/0195961 A1 * | 10/2003 | Breese et al. | 709/226 |
| 2003/0208594 A1 * | 11/2003 | Muret et al. | 709/224 |
| 2004/0172389 A1 * | 9/2004 | Galai et al. | 707/3 |
| 2008/0306968 A1 * | 12/2008 | Nandhra | 707/10 |

OTHER PUBLICATIONS

"Bad Things Shouldn't Happen to Good Websites, Best Practices for Managing the Web Experience, The Privacy Gap: Managing Website Privacy," Watchfire Whitepaper Series, Watchfire Corporation, 2001, 22 pp.
"Bad Things Shouldn't Happen to Good Websites, Best Practices for Managing the Web Experience, The Need for Speed: How optimizing content helps close the Web Experience Gap," Watchfire Whitepaper Series, Watchfire Corporation, Sep. 24, 2001, 17 pp.

* cited by examiner

*Primary Examiner*—Saleh Najjar
*Assistant Examiner*—Tina T Nguyen
(74) *Attorney, Agent, or Firm*—Seth H. Ostrow; Ostrow Kaufman & Frankl LLP (57) ABSTRACT

A method of analysing a Web page comprising the steps of analysing said Web page and identifying content issues; obtaining traffic data for said Web page; correlating said content issues with said traffic data; and producing a report on said correlated data.

19 Claims, 8 Drawing Sheets

METHOD AND SYSTEM FOR CLASSIFYING CONTENT AND PRIORITIZING WEB SITE CONTENT ISSUES

The present invention relates generally to computers and communications, and more specifically, to a method and system for managing Web sites and similar data constructions.

BACKGROUND OF THE INVENTION

In recent years there has been tremendous growth in data communication networks such as the Internet, Intranets, Wide Area Networks (WANs) and Metro Area Networks (MANs). These data communication networks offer tremendously efficient means of organizing and distributing computerized data, which has resulted in their widespread use for both business and personal applications. For example, the Internet is now a common medium for operating online auctions, academic and public forums, distributing publications such as newspapers and magazines, supporting business communications, performing electronic commerce and electronic mail transactions, and offering government services.

However, the tools needed to offer and support such services have not kept pace with the growth and demand. The Internet is now pervasive in industrialized countries, and it is a necessity for any large organization to have an Internet presence. Some large corporate and government agencies, for example, maintain Web sites with millions of Web pages, whose content changes daily; yet they do not have the tools to efficiently manage this massive data system.

Before discussing the specific nature of these problems, it is necessary to set up the framework for discussion.

Figure 1:
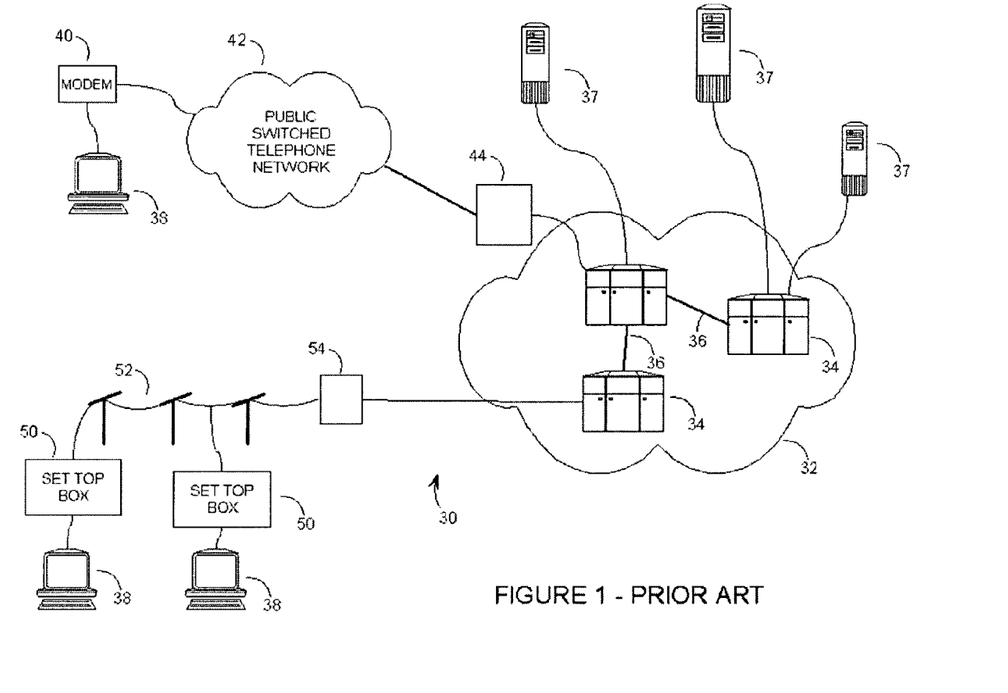
FIG. 1 presents a physical layout of an exemplary data communication network as known in the prior art.

FIG. 1 presents an exemplary layout of an Internet communications system 30. The Internet 32 itself is represented by a number of routers 34 interconnected by an Internet backbone 36 network designed for high-speed transport of large amounts of data. Users' computers 38 may access the Internet in a number of manners including modulating and demodulating data over a telephone line using audio frequencies which requires a modem 40 and connection to the Public Switched Telephone Network 42, which in turn connects to the Internet 32 via an Internet Service Provider 44. Another manner of connection is the use of set top boxes 50 which modulate and demodulate data onto high frequencies which pass over existing telephone or television cable networks 52 and are connected directly to the Internet via Hi-Speed Internet Service Provider 54. Generally, these high frequency signals are transmitted outside the frequencies of existing services passing over these telephone or television cable networks 52.

Web sites are maintained on Web servers 37 also connected to the Internet 32 which provide content and applications to the User's computers 38. Communications between user's computers 38 and the rest of the network 30 are standardized by means of defined communication protocols.

FIG. 1 is a gross simplification as in reality, the Internet consists of a vast interconnection of computers, servers, routers, computer networks and public telecommunication networks. While the systems that make up the Internet comprise many different varieties of computer hardware and software, this variety is not a great hindrance as the Internet is unified by a small number of standard transport protocols. These protocols transport data as simple packets, the nature of the packet contents being inconsequential to the transport itself These details would be well known to one skilled in the art.

While the Internet is a communication network, the World Wide Web (www or simply "the Web"), is a way of accessing information over the Internet. The Web uses the HTTP protocol (one of several standard Internet protocols), to communicate data, allowing end users to employ their Web browsers to access Web pages.

A Web browser is an application program that runs on the end user's computer 38 and provides a way to look at and interact with all the information on the World Wide Web. A Web browser uses HTTP to request Web pages from Web servers throughout the Internet, or on an Intranet. Currently most Web browsers are implemented as graphical user interfaces. Thus, they know how to interpret the set of HTML tags within the Web page in order to display the page on the end user's screen as the page's creator intended it to be viewed.

A Web page is a data file that generally contains not only text, but also a set of HTML (hyper text markup language) tags that describe how text and images should be formatted when a Web browser displays it on a computer screen. The HTML tags include instructions that tell the Web browser what font size or colour should be used for certain contents, or where to locate text or images on the Web page.

The Hypertext Transfer Protocol (HTTP) is the set of rules for exchanging files on the World Wide Web, including text, graphic images, sound, video, and other multimedia files. HTTP also allows files to contain references to other files whose selection will elicit additional transfer requests (hypertext links). Typically, the HTTP software on a Web server machine is designed to wait for HTTP requests and handle them when they arrive.

Thus, when a visitor to a Web site requests a Web page by typing in a Uniform Resource Locator (URL) or clicking on a hypertext link, the Web browser builds an HTTP request and sends it to the Internet Protocol address corresponding to the URL. The HTTP software in the destination Web server receives the request and, after any necessary processing, the requested file or Web page is returned to the Web browser via the Internet or Intranet.

The Web is just one of the ways that information can be disseminated over the Internet. The Internet also supports other communication services such as e-mail, Usenet news groups, instant messaging and FTP (file transfer protocol).

A Web site is a collection of Web pages that are organized (and usually interconnected via hyperlinks) to serve a particular purpose. An exemplary Web site 60 is presented in the block diagram of FIG. 2. In this example, the Web site includes a main page 62, which is usually the main point of entry for visitors to the Web site 60. Accordingly, it usually contains introductory text to greet visitors, and an explanation of the purpose and organization of the Web site 60. It will also generally contain links to other Web pages in the Web site 60.

Figure 2:
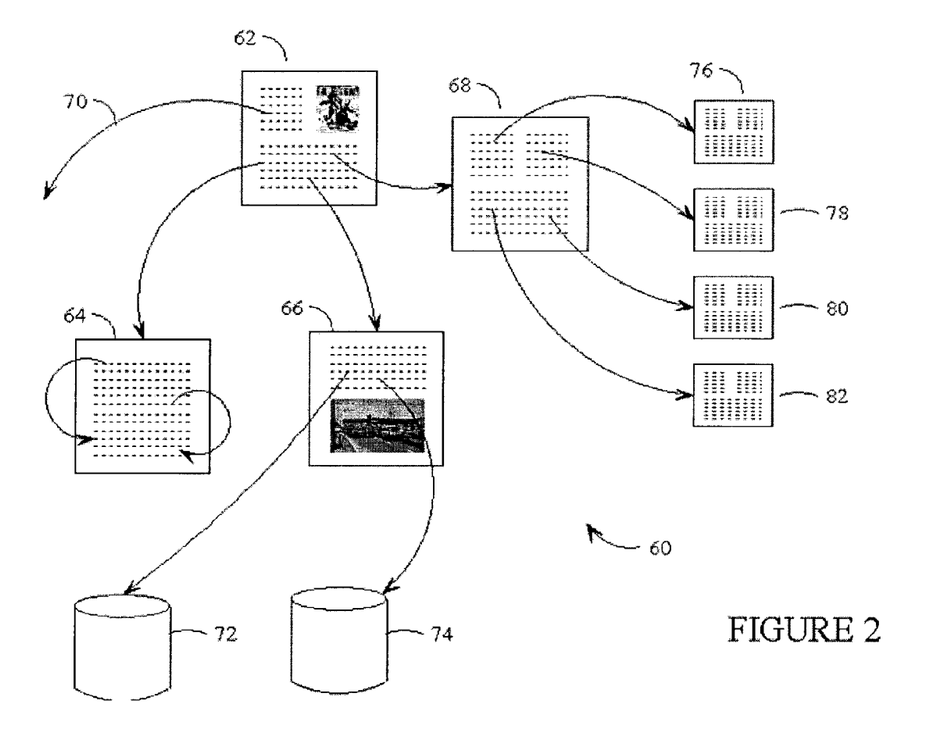
FIG. 2 presents a block diagram of an exemplary Web site architecture, as known in the art.

In this example, the main page 62 contains hypertext links pointing to three other Web pages. That is, there are icons or HTML text targets on the main page 62, which the visitor can click on to request one of the other three Web pages 64, 66, 68. When the visitor clicks on one of these hypertext links, his Web browser sends a request to the Internet for a new Web page corresponding to the URL of the linked Web page.

Note that the main Web page 62 also includes a "broken link" 70, that is, a hypertext link which points to a Web page which does not exist. Clicking on this broken link will typically produce an error, or cause the Web browser to time out because the target Web page cannot be found.

Web page 64 includes hypertext links which advance the visitor to other parts within the same Web page 64. These links are referred to as "anchors". Accordingly, a hypertext link to an anchor which does not exist would be referred to as a "broken anchor".

Web page 66 includes links to data files. These data files are shown symbolically as being stored on external hard devices 72, 74 but of course they could be stored in any computer or server storage medium, in any location. These data files could, for example, contain code and data for software applications, Java applets, Flash animations, music files, images, or text.

There is no limit to the number of interconnections that can be made in a Web site. Web page 68, for example, includes links to four other Web pages 76, 78, 80, 82, but it could be linked to any number of other Web pages. As well, chains of Web pages could also be linked together successively, the only limit to the number of interconnections and levels in the hierarchy being the practical considerations of the resources to store and communicate all of the data in the Web pages.

As noted above, Web sites may have many, many pages. A large corporation or government, for example, may have to administer millions of Web pages which are almost constantly changing. This makes it extremely difficult for the Web site administrator to ensure that there are no content issues in the Web site, such as broken links. Tools do exist for analysing Web sites and locating such content issues (referred to herein as "content scanning") but in a very large Web site, the amount of data with content issues may still be unmanageable.

Suppose for example, that an error caused approximately one thousand Web pages on a particular Web site to fail. Running a content scan would identify the one thousand Web pages with content issues, but this would be of little assistance to the Web administrator. It would still take a tremendous amount of human resources to investigate each reported content issue and correct each Web page. In the meantime, visitors would not be able to find the Web pages they are looking for, and the Web site would operate in an unpredictable and ineffective manner. These content issues on a corporation's Web site could cause material losses, either due to liability incurred or lost business. Thus, while the content scan would help identify the problems, it would be of little assistance in resolving them; it would still take a long time before the Web site would be effective at all.

There is therefore a need for a means of making the analysis and correction of data distribution systems over the Internet and similar networks, much more practical and effective. Such a system should be provided with consideration for the problems outlined above.

SUMMARY OF THE INVENTION

It is therefore an object of the invention to provide a method and system which obviates or mitigates at least one of the disadvantages described above.

One aspect of the invention is broadly defined as a method of A method of analysing a Web page comprising the steps of analysing the Web page and identifying content issues; obtaining traffic data for the Web page; correlating the content issues with the traffic data; and producing a report on the correlated data.

Another aspect of the invention is defined as a method of analysing a Web site comprising the steps of: analysing the Web site and identifying content issues for each Web page of the Web site; obtaining traffic data for each the Web page of the Web site; correlating the content issues with the traffic data; and producing reports on the correlated data.

A further aspect of the invention is defined as a system for analysing a Web site, the system comprising: a Web server; a Content Analysis server; a Traffic Data server; and a communication network for interconnecting the Web server, the Content Analysis server and the Traffic Data server; the Web server supporting the Web site, and being operable to: accumulate traffic data for the Web site; the Traffic Data server being operable to: aggregate the traffic data; and the Content Analysis server being operable to: analyse the Web site and compile a list of content issues for each page of the Web site, the content issues being indexed by Web page; obtain traffic data for the Web pages from the Traffic Data Server; correlate the list of content issues with the Traffic Data; and produce reports on the correlated data.

BRIEF DESCRIPTION OF THE DRAWINGS

These and other features of the invention will become more apparent from the following description in which reference is made to the appended drawings in which:

FIG. 5 presents an exemplary format to report on pages with "Broken Links" in an embodiment of the invention;

DESCRIPTION OF THE INVENTION

As noted above, Web sites are becoming larger and larger, and the rate at Which their content is being changed is ever increasing. Rather than the simple Web sites which contained little more than background and content information, consisting of 6-10 pages that changed on a monthly or annual basis, it is now quite common for Web sites to have hundreds of thousands of Web pages that change on almost a daily basis such as newspaper Web sites. Other Web sites, such as those operated by governments or large corporations, may even have millions of Web pages. Software tools simply do not exist to manage such Web sites in an effective and efficient way.

Figure 3:
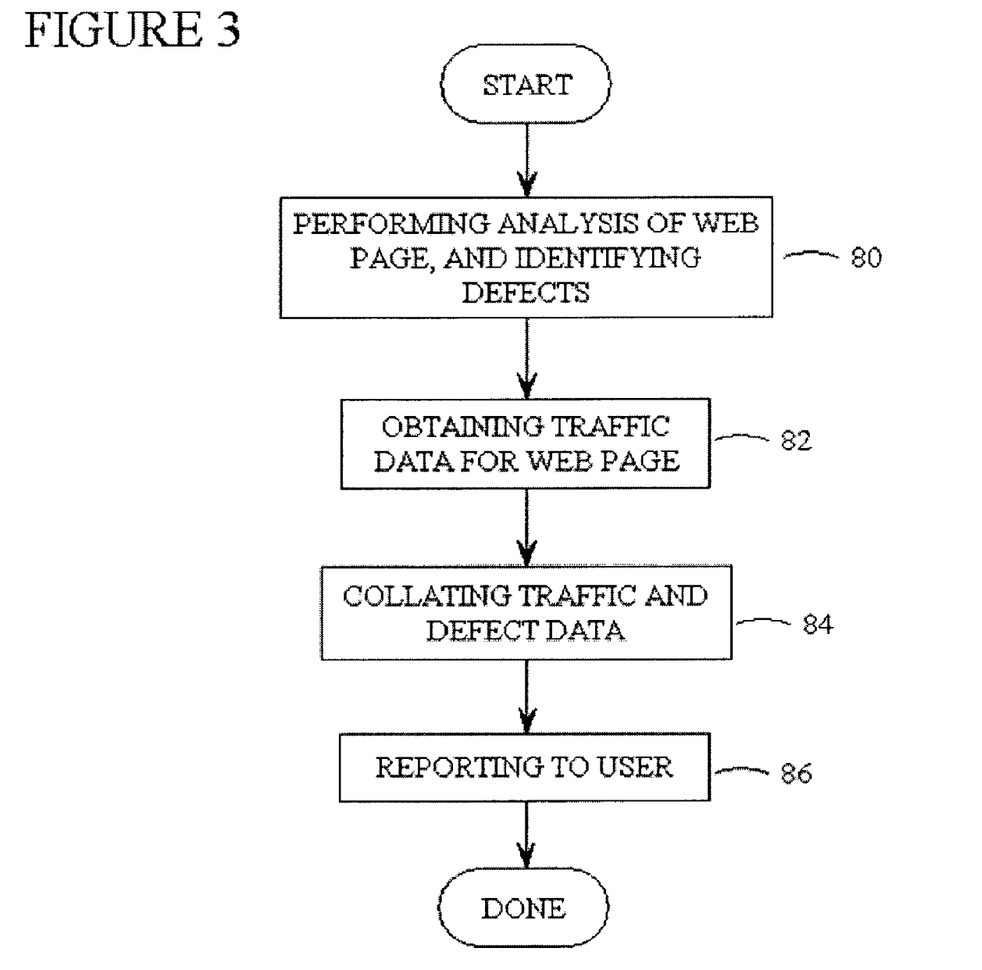
FIG. 3 presents a flow chart of a method of Web page analysis in a broad embodiment of the invention.

FIG. 3 presents a flow chart of a methodology which allows such large and complex Web sites to be maintained and analysed in a far more efficient and practical manner than done in the past. Specifically, this figure presents a method of analysing a Web page in which content issue data is merged with traffic data, allowing problem Web pages to be prioritized.

This methodology begins with an analysis of the targeted Web page at step 80, so that content issues can be identified. This can be done before, after, or at the same time as step 82, the step of obtaining real-world traffic data for the Web page. The traffic data and identified content issues are then correlated with one another at step 84, and reports to the Web administrator produced at step 86.

As will be described hereinafter, this methodology will generally be applied to Web sites with large numbers of Web pages, but could be applied to Web sites of any size. Hence, FIG. 3 refers to the analysis of a single Web page.

Most of the tools needed to effect this methodology are known in the art. Content issue reporting tools used in step 80, for example, are commonly available; exemplary products include Watchfire WebXM™, Coast WebMaster™, Keynote NetMechanic™, Maxamine Knowledge Platform™, SSB InFocus™, HiSoftware AccVerify™ and Crunchy Page Screamer Central™. These tools can report on many Web page content issues, including: broken links, broken anchors, slow pages, missing Alt text, spelling errors, forms, compliance with accessibility guidelines, cookie handling, third-party links and P3P compact policies (a more comprehensive list is given hereinafter).

Similarly, traffic data collection software required for step 84 is also widely available (suppliers including NetGenesis, Mach5 and WebTrends). These tools typically record each visit that is made to a Web site either by analysing Web site logs or by directly interacting with the visitor, recording all of the data in a database. Thus, the traffic database is easily accessed, and since the data is in a rawform (i.e. one record per hit), it is easily manipulated.

An implementation of the invention simply requires that the content issue analysis and traffic tools be integrated, or just output data from these two packages, and report production tools developed.

The actual work that would be required to integrate the content issue analysis tools and traffic data tools would depend on the tools being used, and the design philosophy. In the preferred embodiment described hereinafter, the traffic analysis tools themselves are not integrated at all—the software of the invention simply accesses traffic data which is stored in a file of its own. Similarly, software could be written that accesses files containing content issue data that has been produced by an independent run of a content issue analysis tool. Implementing the invention in this way, the developer only needs to know the format of the traffic and content issue databases, and he can write code to collect the data he requires—no knowledge of how the tools operate themselves is necessary because there is no interaction with the tools.

Conversely, the software of the invention could be integrated with either or both of the traffic and content issue tools.

Traffic data can be understood from a number of perspectives. The basic unit of traffic measurement is a "hit", which represents a single request of a web-based resource (for instance, a Web page). Hits are generally recorded with a timestamp and the Internet protocol (IP) address from which the request to access the web-based resource originated (the "visitor"). Since hit data can be noisy (as one IP address may request the same web-based resource frequently over a short period of time), a more abstract unit of traffic measurement is the "visit". A visit begins the first time a web-based resource is requested by a visitor, and remains open over multiple requests by the same visitor for that resource as long as some specified time (the "timeout") between requests does not elapse. The invention can be implemented using either form of traffic data, though "visit" data would generally be more useful.

The collection of real-world traffic data is usually done over an extended period of time, so that the data are relevant. Thus, step 82 will generally be effected on an ongoing basis. This is not essential however; traffic collection could easily be performed only for specific periods of time.

Once the traffic and content issue data are obtained, the data are correlated so that reports can be produced. These steps, of course could be effected in many ways. Content issue data would generally be collected and indexed by Web page, and indeed, reporting by Web page is generally the most logical way to report. However, content issue data could also be sorted by the nature of the content issue. Certain content issues, for example, might be considered "fatal" content issues, such as pages which contain errors which might cause browsers to crash, or pages which are not linked to any other page. Other content issues might be considered to be less significant (such as Web pages which contain large images which are slow to download), or (such as Web pages which link to outside Web pages which have become outdated).

In the preferred embodiment described hereinafter, the two sets of data (traffic and content issue data) are merged into a single database. Many GUI-based (graphic user interface-based) data management and reporting tools east, so it is quite straightforward to merge this data and produce the desired reports. Reports may simply be presented to the Web administrator on a display screen, printed out, or stored for future reference.

Many different reports could be produced. Four categories of Web site content issues that can be reported on include the following:

quality;

privacy;

accessibility; and security.

Thus, the invention of FIG. 3 addresses the problems in the art. Given large, complex Web sites and a possibly large number of issues with the content of those Web sites, the invention provides an effective way of classifying and presenting the content of the Web sites and the issues that the Web sites contain. Web pages with errors can be identified by issue type, and listed or ranked in order of the number of hits that they receive. In this way, Web pages with the greatest number of hits are the highest priority to correct. Web pages with comparatively few hits are clearly having less an impact on the viability of the Web site, so they can be corrected later.

While software tools do exist which identify content issues in Web sites, they do not consider the magnitude of the effect the content issues have on the Web site. Organizations are looking for ways to analyse content issues on their Web sites in order to take effective action. Integrating traffic data with content issue data allows you to prioritize content issues by high traffic areas, so you can identify and fix the most visible problems first.

Further advantages will become clear from the description of other embodiments of the invention which follow.

DESCRIPTION OF PREFERRED EMBODIMENTS OF THE INVENTION

Prioritizing content issues by high traffic areas allows you to fix your most visible problems first, thus optimizing web resources and lowering web operational costs. The method of the invention helps you apply customer information back into your web design and content management to improve your Web site Return on Investment (ROI).

The invention automates Web site testing and analysis, producing detailed, actionable reports to help organizations detect and manage content quality, privacy, and accessibility issues on large enterprise Web sites. These reports include the following:

identifying unused pages that may indicate areas that need to be removed or redesigned, depending on whether the lack of traffic was an expected result;

"Pages with Broken Links" reports which show how much traffic a page with broken links receives, and how many broken links are on the page. Judging by the amount of traffic the page gets, you can prioritize when to fix it, and determine why an action occurred;

historical trend reports which allow the Web administrator to look at traffic patterns before and after the site has been fixed to understand the impact that site content issues have on traffic; and determining where people are leaving your site, so that you can establish why they are leaving your site. The invention provides traffic analysis data so you can correlate the traffic patterns with content problems.

The invention can be implemented in many different ways. For example, it could be deployed in a centralized service bureau configuration, or as a decentralized hosted service. Many options and alternatives are described hereinafter, but it would be clear to one skilled in the art that many other variants follow from the teachings herein.

Figure 4:
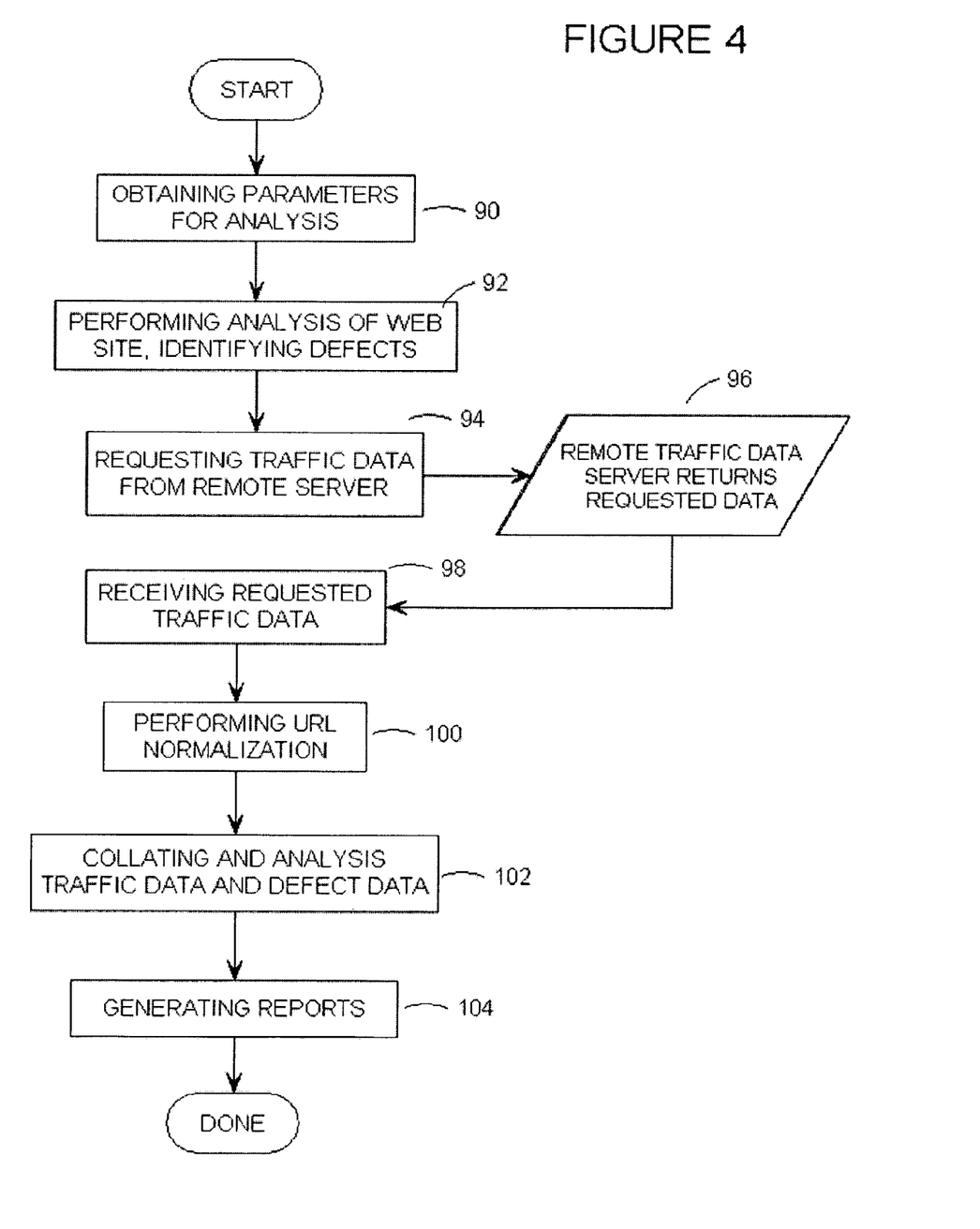
FIG. 4 presents a flow chart of a method of Web site analysis in an embodiment of the invention.

A comprehensive application of the invention with respect to a Web site, is presented in the flow chart of FIG. 4. The general principles for the design of the software were as follows:

1. the core software was designed as two modules: a data gathering and storage module, and a reporting module;
2. the reporting module operates on a database that the data gathering and storage module uses; and
3. graphic user interfaces were presented in a standard Web browser.

The process begins by soliciting the Web administrator to establish the parameters and preferences for the analysis at step 90. The general application of the invention is intended to be very flexible, thus the Web administrator can associate traffic data with a specific domain on the target Web site, and configure the traffic settings for the domain. These settings differ, depending on the type of traffic data source that is being used. The software can support as many traffic connections as required to perform the analysis; preferably these connections are recorded in a table describing each of the dialog box elements, so that they can be confirmed by the Web administrator and stored for future information.

The parameters that have to be defined will vary with the particular application and design philosophy, but in general, the following must be established:

1. regarding the Web site and/or Web pages being analysed:
   a. whether the entire Web site is to be analysed, or just selected Web pages;
   b. whether the Web site and/or Web pages are on one server or multiple servers; and
   c. the URLs of the desired Web sites and/or Web pages must be identified;
2. regarding the traffic data:
   a. the location or locations of that data;
   b. authentication parameters for accessing the data at each location; and,
   c. the format of the data at each location.
3. regarding the integration of traffic data with content issue and characteristic data:
   a. the historical period for which traffic data should be used. This can be done by specifying either:
      i. absolute start and end dates and times for the period, such as "1 Mar. 2003 at 12:00 AM to 5 Mar. 2003 at 12:00 AM";
      ii. relative (with respect to the date and time of the start of the content scan) start and end dates and times for the period, such as "From 5 days before the start of the scan to 2 days before the start of the scan at 12:00 AM"; or
      iii. a combination of absolute and relative specifications, such as "From 5 days before the start of the scan to 5 Mar. 2003 at 12:00 AM";
   b. whether the analysis is to be done with respect to page hits or visits;
   c. the preferences for URL normalization. URL normalization is described in detail with respect to step 100 of FIG. 4, but in short the following must be specified;
      i. whether URLs which are different only in terms of the use of upper and lower case characters should be distinguished as unique;
      ii. whether session IDs are appended to URLs; and
      iii. whether, due to load balancing, multiple URLs point to the same logical web resource
   d. establishing which content issue and characteristic types are to be reported on. As noted above, many types of content issue and characteristics can be reported on, including: broken links, broken anchors, slow pages, missing Alt text, spelling errors, forms, compliance with accessibility guidelines, cookie handling, third-party links, and P3P compact policies. A more comprehensive list is given with the description of step 104 of FIG. 4; and
   e. establishing the manner in which the report data are to be sorted. The data in most reports can be sorted in either ascending or descending order based on the page URL, traffic level, and number of issues. Note that reports detail content issues or characteristics by page (as opposed to a simple catalogue of issues or characteristics) in order to display traffic data for it.

Once the parameters have been established an analysis of the Web site or Web pages can now be performed at step 92. Clearly, this step flows logically from the parameters set at step 90 and the nature of the analysis tools being used. The identified content issues will typically be stored locally in a database, so that it can be accessed as required. This data could also be identified by the parameters used to produce it, so that it can be used for historical analysis. Typically, this will be performed via a Content Analysis server interconnected with the Web site in some manner. For example, Content Analysis software will typically reside on a server that has access to the Web site via the Internet, an Intranet, or local network.

The desirable traffic data is then requested from the traffic data server at step 94. In the preferred method of the invention, the traffic data is collected in an ongoing manner by an external service, and is stored on a remote serer. There are many kinds of traffic data files depending on Web server supporting the targeted Web site, such as IIS (IIS stands for "Internet Information Server"), Apache, NCSA, Netscape and O'Reilly. Each of these Web servers typically has a different format for writing traffic information.

Each time a file is hit or requested by a visitor, the Web server records information about the hit to a traffic data file. One traffic data file generally records a day's worth of hits. A Web server is hit for each file necessary to build the Web page; not only is a hit registered for the html file, but hits also may be registered for any graphics within the HTML page. Similarly, hits on Java applets, ActiveX controls, and executable files are recorded in the log file.

Different Web servers record different information, but the following information is almost always found in Web server log files:
   the requesting computer (i.e. n12.pa.isp.com, or in the form of an Internet IP address 127.192.192.1);
   the date and time of the request;
   the pages which the visitor viewed;
   the success of visitors requests;
   the file that the client requested or downloaded;
   the size of that file; and an HTTP status code. A familiar HTTP status code is: "404 file not found".

In addition, some Web servers log the following information:

the referring URL (i.e. the Web page the user visited just before they "hit" the Web server); and client name (the name and version of the Web browser that the visitor is using, and the operating system the Web browser is running under).

Traffic data files can easily grow to be very, very large. A relatively small Web site that has several thousand visitors a month will have approximately 25 megabytes of traffic data files. While traffic data vendors collect records of each individual hit, they generally make this data available in an "aggregate form", that is, condensing the traffic records by visitor. This makes the downloading and processing of these records far more efficient.

There are two ways to pass the request data from the software of the invention to the traffic application at step 94:

via a database request, so the traffic application can invoke the action to perform the analysis of its data; or, by calling a method on the interface of the traffic application, sending any necessary parameters where the interface could be COM (Component Object Model) or API (Application Programming Interface), both of which are known in the art, or some other interface.

The traffic server will then interpret the request and return the desired traffic data at step 96. This will be done in the manner which the traffic server was designed to, as traffic servers are designed to supply such information.

The traffic data is then received by the software of the invention at step 98 and is stored in a local database, giving the software the flexibility needed to perform the desired analyses and production of reports. It may also be necessary to rationalize the format of the traffic data to match the format that is used by the software of the invention as part of this step.

At this point, the software of the invention has produced two sets of data: the data for the targeted Web pages, and traffic data corresponding to the same set of Web pages. URL normalization is now performed at step 100, if desired. Because of the length of the discussion, URL normalization is addressed under a separate heading below.

The analysis and report generation steps 102 and 104 may now be performed. These two steps will be discussed together because one follows from the other, and they are both driven by the output desired by the Web administrator. In fact, commonly available database management systems essentially perform both steps together as a single set of query code directs both the analysis that is performed and the output of the data. The reports may be printed out, stored in data files, or presented to the Web administrator graphically, for example, using HTML, ASP or XML documents. (HTML and XML are markup languages which are well known. ASP or "Active Server Pages", is a script-based, server-side Microsoft technology for dynamically created Web pages).

Note that there are now two local database tables, one containing Web page content issues, and one containing traffic data. These two database tables are interrelated via the URLs of the Web pages.

Reports can be produced to detail a very large number of content issues and Web page characteristics. The content issues and Web page characteristics include the following:

1. Content Issues:
   a. Broken links—links to resources that cannot be found;
   b. Broken anchors—links to locations (bookmarks) within a page that cannot be found;
   c. Spelling errors—spelling errors, with respect to a language dictionary and/or a domain terminology dictionary;
   d. Links to local files—resources whose location is defined with respect to a local network, and that are not accessible by an external Web browser;
   e. Missing keywords—resources that are missing keywords cannot be indexed by many search engines;
   f. Duplicate keywords—pages that use the same keyword multiple times may be rejected by some search engines;
   g. Missing titles—pages missing a title cannot be indexed by many search engines;
   h. Duplicate titles—identical titles that are used on more than one page cannot be catalogued by many search engines;
   i. Missing descriptions—pages missing descriptions may not be as effectively indexed by many search engines;
   j. Images missing Alt text—images missing Alt text are an accessibility issue;
   k. Images missing height or width attributes—images missing height or width attributes force the web browser to infer the proper layout of a pages. This consumes system resources and affects the visitor experience;
   l. Deep pages—content that is deeply embedded in the structure of a web site (i.e., many clicks away from the home page) are difficult for visitors to navigate to;
   m. Slow pages—pages whose total download size (the page itself plus any images, applets, and other downloadable components) exceed some size specified by the Web administrator which may be prohibitive to download over slow connections;
   n. Warnings and redirects—pages that either redirect the user to other content or return a server warning;
   o. Browser compatibility—pages whose markup elements may not be interpreted properly by one or more types or versions of Web browser;
   p. Cookie handling by browser privacy settings—cookies that maybe rejected under default privacy settings in popular Web browsers;
   q. Missing privacy links—pages that do not have a link to a privacy statement may expose website owners to legal liability,
   r. Forms on pages missing privacy links—pages with forms but that are missing links to a privacy statement may be collecting personal information without giving visitors access to a privacy statement; this may expose website owners to legal liability,
   s. Forms with controls that are prepopulated—form controls that are pre-populated can expose website owners to legal liability;
   t. Forms by submit method (GET or POST)—forms using the GET submit method transmit data non-securely, this may expose Web site owners to legal liability;
   u. Forms by page security level—forms on pages with low or no security may transmit data that is easily decrypted; this may expose Web site owners to legal liability;
   v. Cookies—cookies set by a third-party may use personal information inappropriately, and may expose Web site owners to legal liability,
   w. Web beacons—Web beacons are a common way of having one site 'spy' on the visitors to a third-party site. This may expose Web site owners to legal liability;
   x. P3P compact policy—cookies on pages without a P3P compact policy may be rejected by web browsers, and so may affect a visitor's experience;

y. Third-party links—third-party links may lead to inappropriate content, and may expose site owners to legal liability, and z. adherence to accessibility guidelines (e.g., US Section 508; W3C WCAG 1.0, 2.0, etc.; user-specified guideline)—ensuring that pages comply with accessibility guidelines may be mandated by local legislation, and is good business practice 2. Content characteristics
   a. Website domains—the domains that are internal to or that can be linked to from a website
   b. File (MIME) types in use—the different types of content that are in use across a website
   c. Image inventory—images that are in use across a website
   d. File inventory—files that are in use across a website
   e. Multimedia content—multimedia content that is in use across a website
   f. Server-side image maps—server-side image maps affect page performance, and are a largely deprecated web-technique
   g. Style sheets in use—style sheets in use across a website
   h. Pages using style sheets—pages that make use of style sheets
   i. Old pages—content that is old, and maybe in need of updating
   j. New pages—content that is new, and may be in need of review
   k. Small pages—pages that maybe missing content, and so are of no value to site visitors
   l. Metadata inventory—metadata elements that are in use across a site In addition, Web administrators may configure custom rules (that correspond, for instance, to a corporate content or "look and feel" standard) and report on pages that are not in compliance with these rules; reports can be produced that detail the aggregate issues on a page; and, searches for content by issue or characteristic can be performed.

Other analyses which can be performed and reported upon in conjunction with the above, include the following:

1. based on an analysis of the paths visitors take:
   a. the most common paths through the Web site (golden paths), or through any particular region of the Web site;
2. based on normalization of URLs:
   a. number of visitors per URL;
   b. number of visitors per file;
   c. number of visitors per image;
   d. number of hits per URL; and
   e. number of hits per file (for download);
3. based on analysis of visitor identities:
   a. number of unique visitors per URL;
   b. number of unique visitors per pages; and
   c. number of re-sent Web pages;
4. time-based analyses:
   a. statistical data about number of visitors or number of hits to show the most frequently used URLs or pages or the highest traffic period of the day or week;
   b. historical reports about traffic in the last period information before modification the site or update the page or upgrade the servers; and
5. other:
   a. most requested pages, images, and files;
   b. errors produced from particular URLs;
   c. the size of the data transferred through the Web server so the Web administrator can determine whether the Web server is slow and the bandwidth of the server;
   d. most requested downloaded files;
   e. if the Web administrator has more than one site, he can compare the same data from different sites; and
   f. pages which visitors have requested that weren't revealed by the content scan.

The priority of these measurements may vary from one Web administrator to another, or even from one analysis to another.

Several exemplary reports are described hereinafter.

URL Normalization

"Normalizing" a URL is the process of modifying a URL to its lowest denominator. As noted above, it may be desirable to normalize URLs in the traffic data by removing distinctions made by:

1. the "case" of the characters in the recorded URLs (i.e. upper case versus lower case);
2. the presence of session identifiers (session id's). A session id is a variable name within the URL that changes the characters in the URL string, but has no impact on how the URL traverses the Internet to arrive at the desired location; and
3. reconciling differences in URLs due to load balancing. Load Balancing is the process of high traffic Web servers re-directing visitors to a different domain that is not as busy. The content on all of the domains are identical so issues should be reported once rather than as separate issues on each domain.

The rules that govern the URL normalization process are established during the parameter setup step 90, and apply to all URLs within that analysis.

The individual transformations that consist of the concept of normalizing may change over time as new concepts are added but the underlyng meaning of it will be consistent. Each URL encountered is processed through a set of transformations to reduce it to its normal form. The content issues and characteristics for multiple URLs whose normal forms are identical will be reckoned only once; traffic for multiple URLs whose normal forms are identical will be summed across each non-normal URL to achieve a total traffic number for that normal URL.

To maintain optimal performance the software should be designed to store the current optimization preferences rather than having to access the preference data every time a new URL is processed.

Exemplary URL normalization transformations include the following:

1. option indicates that URLs are not case sensitive (i.e. switch all upper-case characters to lower case). For example:
   a. convert http://qatm01/lbeTestSite/Links/Links.htm, to http://qatm01/lbetestsite/links/links.htm; and
   b. convert http://www.watchfire.com/AboutWatchfire.html to http://www.watchfire.com/aboutwatchfire.html;
2. option indicates that URLs are case sensitive (i.e. do not switch upper-case characters to lower case). For example:
   a. do not change http://qatm01/lbeTestSite/Links/Links.htm, at all; and
   b. do not change http://www.watchfire.com/AboutWatchfire.html at all;
3. option indicates that URLs have the following to identify sessions: sid, Sessionid, refer, and delimiters "&" and "_". (i.e. delete all characters after "SID"). For example:
   a. convert: http://qatm01/lbetestsite/path/path3/indexhtm?sid=2&sessionid=1 _refer=1 to: http://qatm01/lbetestsite/path/path3/indexhtm?;

b. convert http://qatm01/lbetestsite/path/path3/2.htm?sid=2&sessionid=2 to http://qatm01/lbetestsite/path/path3/2.htm?; and
c. convert http://qatm01/lbetestsite/path/path3/21.htm?sid=2 to http://qatm01/lbetestsite/path/path3/21.htm?; and
4. option indicates that ww1.compaq.com, ww2.compaq.com and ww3.compaq.com should be mapped to www.compaq.com
a. convert ww1.compaq.com to www.compaq.com; and
b. convert ww2.compaq.com to www.compaq.com; and
c. convert ww3.compaq.com to www.compaq.com.

The above options can, of course, be used in combination. For example, if the preferences are set as follows: options indicate site is not case sensitive, has a session identifier as "sid" and should match ww5.watchfire.com to www.watchfire.com then ww5.watchfire.com/index.html?sid=92 will be converted to www.watchfire.com/index.html?.

Currently the session id is searched for within the entire URL so if the session id variable happens to be in the path then the URL will be stripped early. If the Web administrator had an option to identify a character that identified the beginning of any session variables then they could define where search started. In most sites this would be defaulted to the "?" character. To implement this the session id could be searched in the URL from anything following this character.

Traffic Vendors

There are many existing traffic data vendors and as the invention is not limited by the nature of the traffic vendor, it could be applied to any such vendor. The systems used by three exemplary traffic vendors are described hereinafter. Generally, each of these traffic data vendors produces data records for each hit on a targeted Web site, these data records containing: URL, user ID, data and time. Other specific design considerations for integrating the invention with each of these traffic vendors are as follows:

1. NetGenesis

NetGenesis provides access to e-customer analytics and e-metrics via a flexible, fully integrated Web-based thin client interface:
provides a complete suite of business reports and e-metrics;
allows users to "drill everywhere" and sort data anyway they want; and
provides OLAP-style analytics offer fast, consistent, interactive ways to manipulate data, for more useable, more revealing data views.

2. Mach5 FastStats Analyser

FastStats provides similar traffic data reporting to that of Netgenesis, such as the pages visitors access most, what links they click, and from what pages they leave. It also records other non-traffic data that is helpful in the implementation of the invention, such as what browsers and computer visitors use, and the amount of data transferred per page. Other data that FastStats reports on include:
data based on "hits", such as average data transferred per hit, and average number of hits per day. Unfortunately, each Web page on a Web site generally includes many sub-elements such as graphic images, each of which will be recorded as a "hit" when the visitor's browser calls for each element from the Web server;
Incomplete downloads/file requests (i.e. the number of hits that were not completely received by the client). A large number of incomplete requests may indicate that page elements, such as images, are too large and the Web server is slow. Incomplete requests generally occur when the user presses the "Stop" button in the browser to cancel the transfer of an image, or cancels the download of a large file;
Total Failed Requests. The most common failed request is the 404 "file not found" error; and
Total Visiting Users. The concept of a user is hard to define. FastStats uses the widely accepted I/PRO method of calculating the number of users who have visited—each unique IP address visiting the Web site is considered a user, and a request from that same IP address over 30 minutes after the last request also adds to the user count.

FastStats Analyser can analyse the log files at speeds between 80-100 megabytes per minute. FastStats Analyser does not have a developer's kit, but does support the export of reports to Word or HTML formats.

3. WebTrends

The WebTrends Enterprise Suite is a Web site management solution for single or clustered servers, combining cartridges for Web server traffic analysis, streaming media server analysis, proxy server analysis, link analysis and quality control and monitoring, alerting and recovery of Internet servers.

WebTrends records data and produces reports much like the others in the art, including: general statistics, most requested pages, least requested pages, most downloaded files, activity level by day of week, activity level by hour, bandwidth, page not found (404) errors, server errors, and the like. It also records data of particular interest in the implementation of the invention, such as: referring sites, referring URLs, search engines, search phrases, browsers and platforms, visiting spiders, most-used platforms and operating systems.

WebTrends can analyse the log files at speeds between 15-20 megabytes per minute, which is slower than others. However WebTrends has an API interface to integrate with the system of the invention and has a large number of standard reports.

Exemplary Reporting Formats

FIGS. 5 through 8 present exemplary screen captures of reports in various embodiments of the invention. These displays all use a Web browser as an interface application, and were written in XML. Other display formats and software could also be used.

FIG. 5 for example, presents a graphic display of a "Pages with Broken Links" report, with a set of Help, About and Logout Tabs 110, which are standard for all of the reports in this embodiment of the invention. It also includes four information frames:
1. an index frame 112 which lists headings for each Web page in the software package of the invention;
2. a "report properties frame" 114 which lists the properties of the current report, the "Pages with Broken Links" report;
3. an "overview frame" 116 which summarizes the results of the report; and
4. a "details frame" 118 which breaks down the results of the report for each Web page in the analysis.

The index frame 112 is common to all of the reports. By clicking on different headings the Web administrator can expand the entry identifying all of the subpages linked to the Web page heading that he has clicked on. Also at the top of this index frame 112 are two icons, one labelled "expand all" and the other labelled "collapse all"; clicking on the "expand all" icon shows the headings for all of the Web pages in the hierarchy and clicking on the "collapse all" icon reduces this list only to the main headings.

Note that FIG. 5 presents an expanded list of the reports under the "site Defects" heading, specifically, reports titled: Broken Links, Broken Anchors, and Pages with Broken Anchors. Other similar reports could also be entered under this heading.

The report properties frame 114 lists the relevant properties and parameters as set by the Web administrator for this particular report. As shown in FIG. 5 this embodiment of the invention includes the title for the report ("Pages with Broken Links"), the date on which this report was last updated, the source of the analysis data (along with a link to a page containing all of the parameters and preferences for the analysis), the scope of the data and which scope of metatags were considered in the analysis.

In this embodiment, the overview frame 116 provides three pieces of information:
1. a pie chart which shows the percentage of the Web pages in the scope of the analysis which include content issues;
2. the absolute number of Web pages with the content issues; and
3. the percentage of Web pages that meet the problem threshold (i.e. in some reports it may be of interest to only report on pages which have a certain minimum number of warnings or defects).

As shown in FIG. 5, the details frame 118 presents five columns of information:
1. a list of the Web pages that contain broken links;
2. the number of broken links contained by each of these pages;
3. the percentage of total site traffic directed to those pages over the specified historical period for traffic data use;
4. an "About" column which provides an iconic representation of the overall quality of the page. This measure is derived from the total number of defects and the severity of that particular Web page; and
5. a column containing a "View" icon.

Clicking on various elements in the table will result in new views of the data:
1. clicking on either the URL, Quantity, Traffic, or About columns will cause the data to be resorted in accordance with the heading that has been struck;
2. clicking the URL for a page will access a detailed report of all of the broken links on that page;
3. clicking the icon in the "About" column will access a detailed report of all of the characteristics of, and defects on that Web page; and
4. clicking the icon in the "View" column will open the specified Web page in a new Web browser window.

Figure 6:
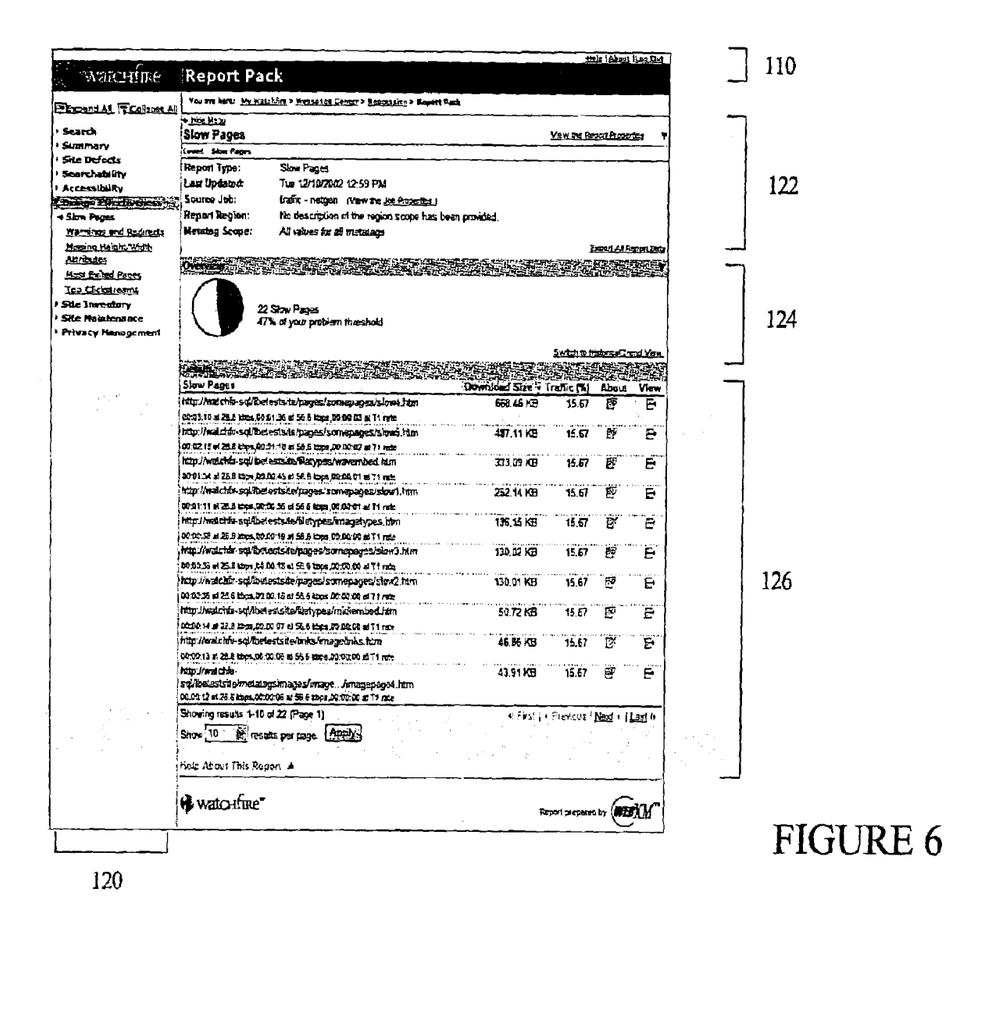
FIG. 6 presents an exemplary format to report on "slow Pages" in an embodiment of the invention.

FIG. 6 presents a report which identifies "slow pages" and is structured basically in the same way as the report presented in FIG. 5. That is, it includes an index frame 120, a report properties frame 122, an overview frame 124 and a details frame 126, while the set of Help, About and Logout Tabs 110 is basically the same as that of FIG. 5.

In this case, the index frame 120 has the headings under "Design Effectiveness" expanded, to reveal the headings for the Slow Pages, Warnings and Redirects, Missing Height/Width Attributes, Most Exited Pages, and Top Clickstream reports.

The entries in the report properties tame 122 will of course be dedicated to the particular "slow pages" report being produced. Like FIG. 5, the overview frame 124 will present a summary of the results of the slow pages report, specifically, a pie chart, the absolute number of Web pages with the "slow pages" content issue and the percentage of the problem threshold that the absolute number represents. Note that Web administrators are able to specify the total page size (the Web page itself plus any associated resources) that constitutes a slow page; this size can be set according to the type of site (business or entertainment) and the target audience (Intranet users with high bandwidth, or dial-up internet users with low bandwidth connections).

In this case, the details frame 126 will present the following information:
1. identification of the URLs for each of the Web pages in the report under the heading "slow pages";
2. the total size of all the data for each of these Web pages in the second column titled "download size";
3. the corresponding traffic level for each of these Web pages;
4. "About" information as described above with respect to FIG. 5; and
5. "View" information as described with respect to FIG. 5.

Figure 7:
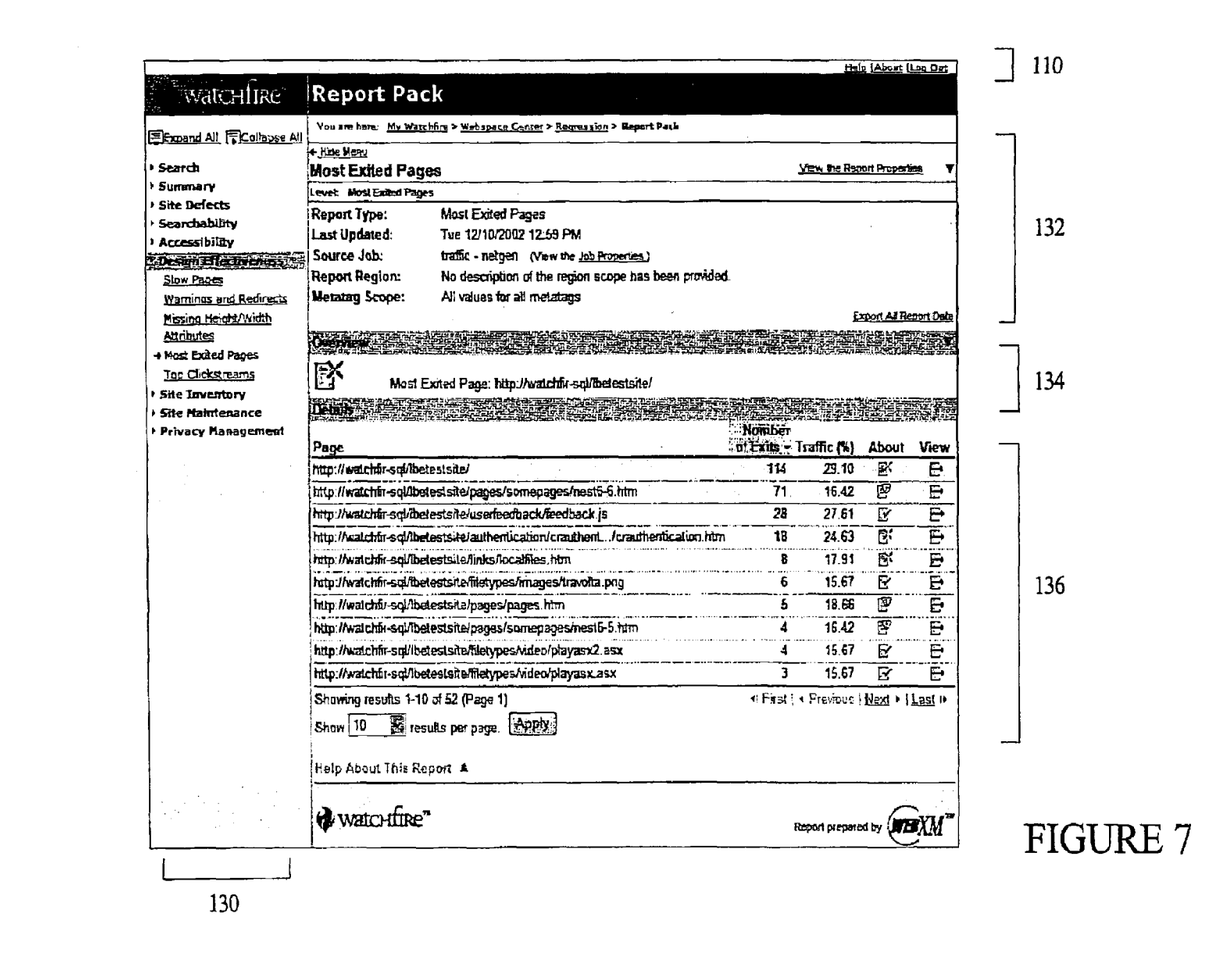
FIG. 7 presents an exemplary format to report on "Most Exited Pages" in an embodiment of the invention.

FIG. 7 presents another "Design Effectiveness" report titled "most exited pages". Determining where from within a Web site visitors most regularly leave, allows the Web administrator to correlate abandonment with problems, and improve his Web site. For example, visitor's may exit the Web site because of:
1. poor performance, such as slow pages;
2. poor navigation, such as broken links;
3. poor searchability (e.g. missing metadata); or
4. poor Privacy; e.g. forms collecting PII (personally identifiable information) without security.

Site abandonment can cause lost sales, impact offline brand, and drive visitors to the competition. This information helps you correlate content issues with the pages that are abandoned the most and prioritize which pages need to be fixed first.

Like FIG. 6, this report contains a set of Help, About and Logout Tabs 110, an index frame 130, a report properties fame 132, an overview frame 134 and a details frame 136.

Like FIG. 6, the index frame 130 has the headings under "Design Effectiveness" expanded. As well, it also has the headings under "Privacy Management" expanded. Any number of headings may be expanded at any time, regardless of where the report itself is listed. Also like FIG. 6, the entries in the report properties fame 132 are dedicated to the "Most Exited Pages" report.

However, unlike FIG. 6, the "Overview" frame 134 does not provide a pie chart and general statistics, as they are not relevant. Instead, the "Overview" frame 134 simply presents the URL with the most exits.

Like the other reports, the Details frame 136 of this report provides comprehensive data to the Web administrator. For example, it would typically include the following:
1. identification of the URLs for each of the Web pages in the report under the heading "Page";
2. the total number of exits from that particular page in the second column titled "Number of Exits";
3. the corresponding traffic level for each of these Web pages;
4. "About" information as described above with respect to FIG. 5; and
5. "View" information as described with respect to FIG. 5.

Figure 8:
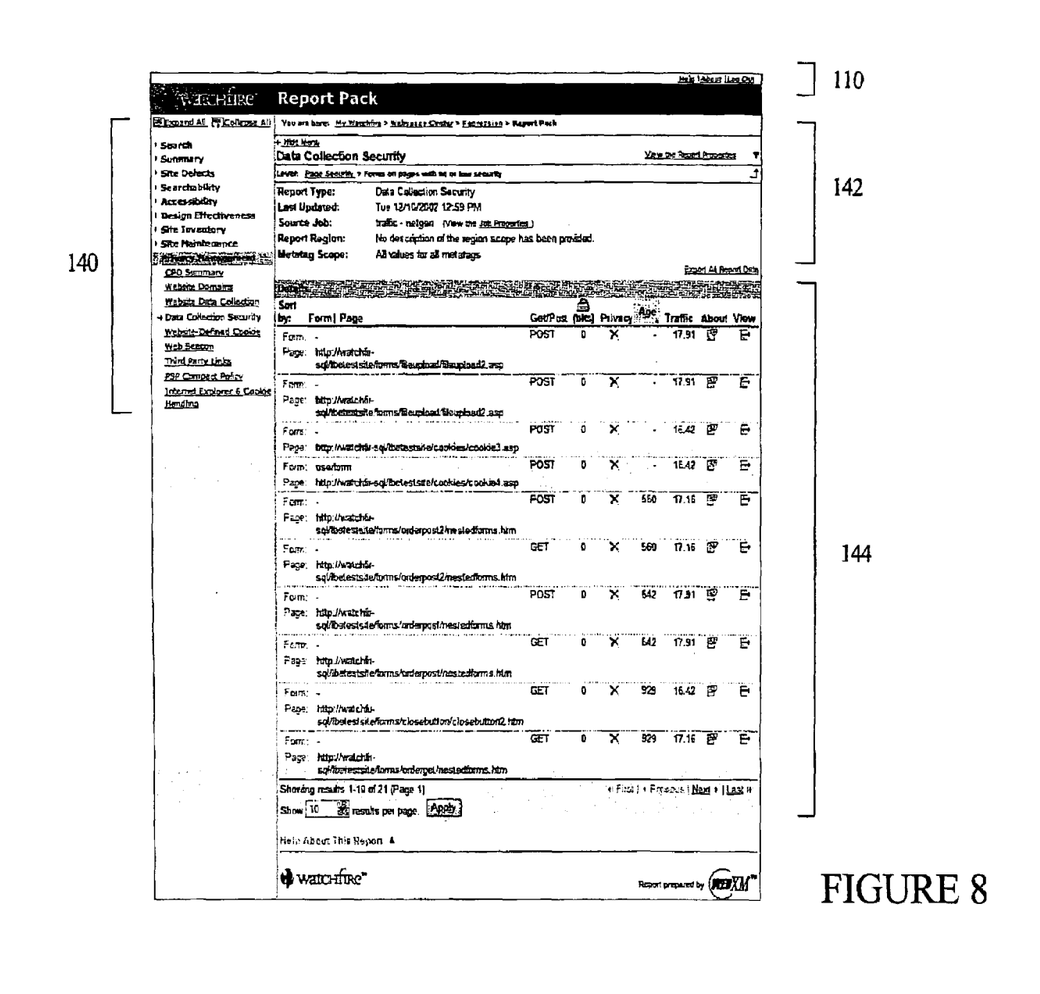
FIG. 8 presents an exemplary format to report on "Top Clickstreams" in an embodiment of the invention.

FIG. 8 presents an exemplary graphic interface for the "Data Collection Security Report". This report is also structured much the same way as the reports described above, in that it has a set of Help, About and Logout Tabs 110, an index frame 140, a report properties frame 142 and a details frame 144. The menus and toolbars frame 110 is the same as those described above.

The index frame 140 is the same as the other index frames above, except that the "Privacy Management" heading has been expanded to show the relevant reports that are available in this embodiment of the invention. These reports could include for example:

1. CPO summary,
2. Web site domains;
3. Web site data collection;
4. data collection security;
5. Web site define cookie;
6. Web beacon;
7. third party links;
8. P3P compact policy;
9. Internet Explorer 6; and
10. cookie handling.

The report properties frame 142 is also similar to the report properties frames of the other reports in that the parameters by the current analysis are presented.

The details frame 144 in this case, however, includes the following:
1. identification of the URL's for each of the subject Web pages in the first column;
2. a column identifying whether the particular page performs a get or a post of data;
3. a security column;
4. a privacy column;
5. an age column;
6. a Traffic column which presents the traffic level for each page;
7. a Quality column; and
8. a View column.

The system and method of the invention provides many advantages to the Web administrator. For example:
1. it provides a means for prioritizing all occurrences of a content issue of a given type by the number of Web site visitors who will be impacted by that issue;
2. it allows the impact of a given individual Web site content issue on the total population of users visiting the Web site to be measured;
3. it allows pages of a Web site with specific attributes (for example, containing specific text) to be classified by the number of Web site visitors to that page;
4. it works with a wide variety of Web site content issues (such as broken anchors, broken links and browser compatibility issues); and
5. it works with a wide variety of types of content issues (such as quality issues, privacy issues and Web site accessibility issues).

Thus, the method of the invention allows many Web site management content issues to be addressed. For example, it provides valuable data needed to answer the following questions:
1. "Can I reduce the size of my Web site?"
   The invention allows you to identify pages and files on your site that are not being visited. Based on this information, you can reduce the amount of content on your site, and reduce the corresponding maintenance costs.
2. "Should I change my Web site design?"
   The invention identifies pages that are not being visited. If these are sections of your site that you want to attract visitors to, then you may wish to redesign your Web site.
3. "Why do people leave my site?"
   The invention allows you to correlate abandonment or low traffic metrics with Web site problems such as poor performance (e.g. slow pages); poor navigation (e.g. broken links); or poor searchability (e.g. missing meta-data). The Most Exited Pages report in particular, provides such data.
4. "What problems do I fix first?"
   The invention allows you to prioritize problems by traffic to identify impact of problem areas and protect your golden paths. The Top Clickstream report in particular, provides such data.

Options and Alternatives

A number of embodiments of the invention have been described, but clearly many others can be effected from the teachings herein. For example:
1. the invention is preferably implemented as a server application but may also be PC (personal computer) based;
2. in general, when the software of the invention integrates with other programs there is no need for data duplication—the data maybe saved on one database and the software of the invention and the other applications can use this shared database.
   However, if we run the traffic analysis over some period (such as the last month) the invention can save the results of this analysis so if we need the same period, the software of the invention does not need to run the traffic analysis again.
   There are many ways to store the output. To display the results, the invention will use any then current presentation technology.
   Storing historic data in a local database will allow it to be accessed very quickly if needed; and
3. the invention may also be provided with a schedule agent so that it can obtain traffic each day as a midnight batch, for instance.

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as object code or source code. Such code is described generically herein as programming code, or a computer program by simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such as computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

What is claimed is:

1. A method of analyzing a Web site comprising the steps of:
   accumulate traffic data for said Web site, performed by a web server supporting the Web site;
   aggregate said traffic data, performed by a traffic data server;
   identifying, via a content analysis server, Web site content issues relating to the operations of said Web site, wherein said content issues are selected from the group consisting of: broken links, broken anchors, slow pages, missing Alt text, spelling errors, forms, compliance with accessibility guidelines, cookie handling, third-party links and P3P compact policies, the content analysis server interconnected with the web server and the traffic data server via a communication network;

analyzing each Web page of said Web site and identifying occurrences of said content issues, wherein the analyzing is done in response to parameters set by a Web administrator including querying the Web administrator to input parameters for said analysis;

obtaining traffic data for each said Web page;

performing URL normalization of the traffic data obtained from each of said Web page wherein URL normalization includes case sensitive transformations, session identifier detection and load balancing reconciliation;

correlating said content issues for a given one of said Web pages with said URL normalized traffic data;

prioritizing content issues on the Web site based on the traffic data and content issues; and producing a report on said correlated data so that higher priority content issues on said Web site may be identified.

2. The method of claim 1 wherein said step of performing URL normalization comprises the step of: removing session identifiers from URLs in traffic data.

3. The method of claim 1 wherein said step of performing URL normalization comprises the step of: correlating URLs of mirror sites with corresponding URLs of a main server.

4. The method of claim 1 wherein said step of performing URL normalization comprises the step of: switching upper case characters in URLs of traffic data to corresponding lower case format.

5. The method of claim 1 wherein said step of producing comprises the step of: collecting traffic data records within a certain time range thereby allowing the production of historical trend reports.

6. The method of claim 5 further comprising the step of: compiling data for time periods before and after a Web site was changed, allowing the Web administrator to consider the impact of changes.

7. The method of claim 1 wherein said content issues are selected from the group consisting of quality, privacy, accessibility and security.

8. The method of claim 7 wherein said step of producing comprises the step of sorting said Web pages in order from greatest number of content issues to least number of content issues.

9. The method of claim 7 wherein said step of producing comprises the step of sorting said Web pages in order from greatest traffic flow to least traffic flow.

10. The method of claim 7 wherein software code for effecting said method comprises an analysis module and a reporting module.

11. The method of claim 7 further comprising the step of identifying Web pages which exceed a certain threshold level for certain content issues.

12. The method of claim 7 wherein said step of identifying content issues further comprises the step of indexing said content issues by Web page.

13. The method of claim 12 wherein said step of correlating comprises the step of correlating said content issues with said traffic by Web page.

14. The method of claim 7 further comprising the step of: importing traffic data from a remote traffic server.

15. The method of claim 14 further comprising the step of: converting said imported traffic data to a universal format.

16. The method of claim 14 wherein said traffic data comprises a separate data record for each hit.

17. The method of claim 1 wherein said step of producing a report comprises the step of producing a report advising on why visitors are leaving the Web site.

18. The method of claim 1 wherein said content issues are defects.

19. A system for analyzing a Web site, said system comprising:

a Web server;
a Content Analysis server;
a Traffic Data server; and
a communication network for interconnecting said Web server, said Content Analysis server and said Traffic Data server;
said Web server supporting said Web site, and being operable to:
accumulate traffic data for said Web site;
said Traffic Data server being operable to:
aggregate said traffic data; and
said Content Analysis server being operable to:
identify Web site content issues relating to the operations of said Web site, wherein said content issues are selected from the group consisting of: broken links, broken anchors, slow pages, missing Alt text, spelling errors, forms, compliance with accessibility guidelines, cookie handling, third-party links and P3P compact policies;
analyze said Web site and identify occurrences of said content issues for each Web page of said Web site, said occurrences of said content issues being indexed by Web page, wherein the analyzing is done in response to parameters set by a Web administrator including querying the Web administrator to input parameters for said analysis;
obtain traffic data for said Web pages from said Traffic Data Server;
performing URL normalization of the traffic data obtained from each of said Web page wherein URL normalization includes case sensitive transformations, session identifier detection and load balancing reconciliation;
correlate said identified occurrences of said content issues with said URL normalized Traffic Data; and
prioritize content issues on the Web site based on the traffic data and content issues; and
produce a report on said correlated data so that higher priority content issues on said Web site may be identified.

* * * * *

UNITED STATES PATENT AND TRADEMARK OFFICE
CERTIFICATE OF CORRECTION

PATENT NO. : 7,624,173 B2 Page 1 of 1
APPLICATION NO. : 10/361948
DATED : November 24, 2009
INVENTOR(S) : Bary et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Twenty-sixth Day of October, 2010

David J. Kappos
*Director of the United States Patent and Trademark Office*